Dec. 16, 1969 S. L. GOLDBERG 3,483,744
ROLLING WHEEL TEST DEVICE
Filed Aug. 21, 1967 2 Sheets-Sheet 1

INVENTOR.
SIDNEY L. GOLDBERG
BY
JOSEPH H. GOLANT
ATTORNEY

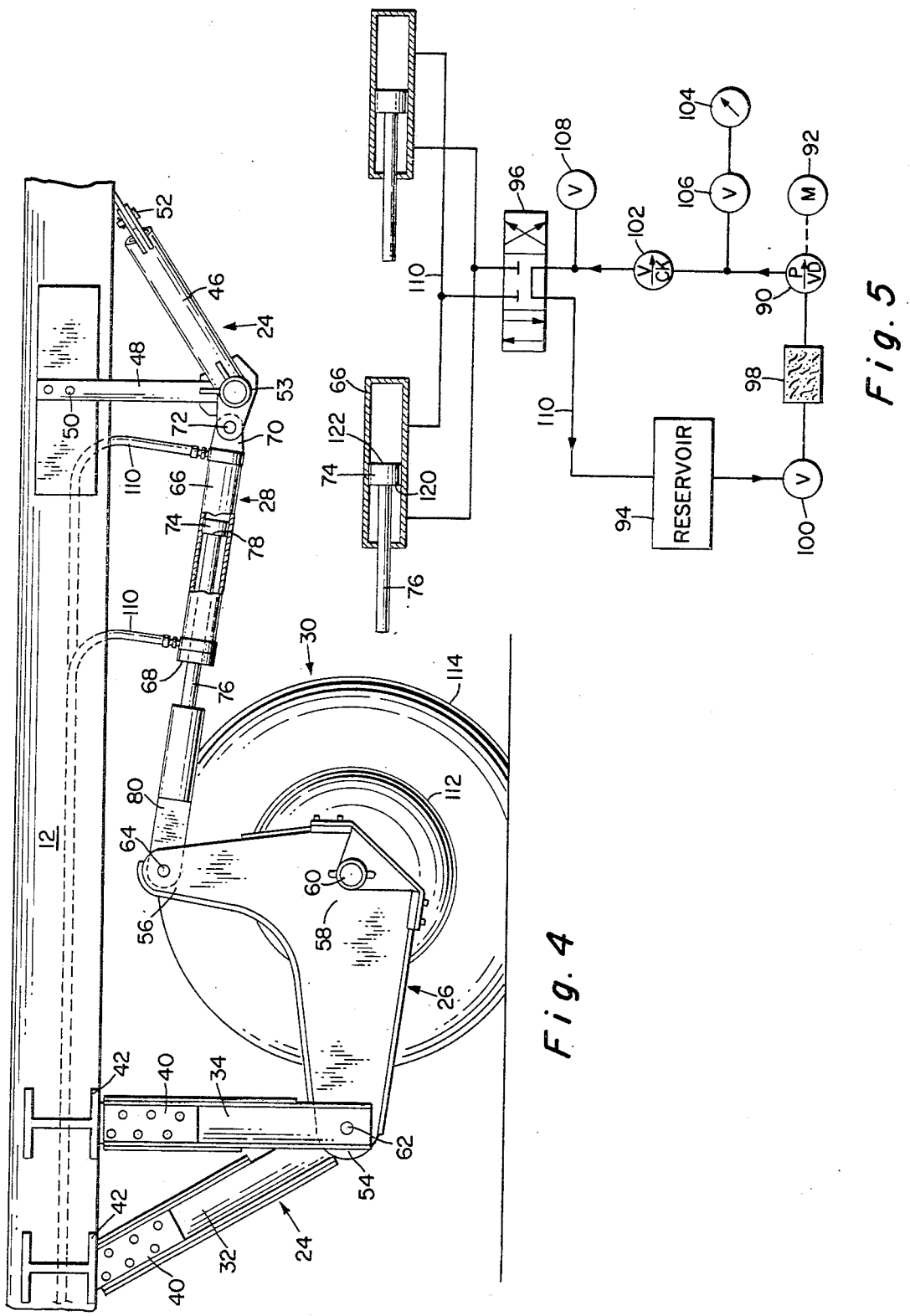

United States Patent Office 3,483,744
Patented Dec. 16, 1969

3,483,744
ROLLING WHEEL TEST DEVICE
Sidney L. Goldberg, Oxnard, Calif., assignor to the United States of America as represented by the Secretary of the Navy
Filed Aug. 21, 1967, Ser. No. 662,208
Int. Cl. G01m 17/02; G01n 3/00
U.S. Cl. 73—146                         2 Claims

ABSTRACT OF THE DISCLOSURE

The description discloses a dynamic test device which may be used to test the bearing qualities of a portion of ground or the strength or wear characteristics of a wheel or tire. The device comprises a test wheel, a hydraulic system to allow loading of the wheel, a support for the wheel and a frame to allow easy attachment to the underside of a trailer of a truck-trailer combination.

---

The invention described herein may be manufactured and used by or for the Government of the United States of America for governmental purposes without the payment of any royalties thereon or therefor.

BACKGROUND OF THE INVENTION

Field of the invention

The present invention relates to a test device and more particularly to a dynamic ground, wheel or tire testing device.

Description of the prior art

The present invention was developed as a convenient means to test the bearing capacity (support strength) of compacted snow so that the snow could be used for an aircraft runway. Such runways are regularly used in areas such as the Antarctic. Before the development of the present invention ground testing was conducted by a ski equipped aircraft which taxied back and forth along the runway attempting to disclose soft spots which would then be repaired. A drawback to such a method of testing is that the ski equipped aircraft could not systematically traffic an entire runway within a reasonable period of time available for such tests. Since it was imperative that the degree and uniformity of bearing strength on snow runways be determined before landing an aircraft without skis, a second device was tried. The device consisted of a 13 wheeled 20 ton capacity pneumatic tired roller which had been modified to conduct the test. As with the taxied aircraft the pneumatic tired roller showed limitations which made it imperative that still another testing means be developed.

SUMMARY OF THE INVENTION

The present invention has solved the problems encountered by providing a simple and reliable testing device that is adapted to be attached to the underside of a standard truck-trailer. The testing device comprises a rotatable test wheel adapted to be connected to a movable vehicle such as a standard truck-trailer for contacting and bearing upon a portion of ground, a wheel support means adapted to be connected to the vehicle for supporting the wheel and for receiving a wheel loading force and transmitting the loading force to the wheel, a force applicator connected to the wheel support means for selectively applying a loading force to the wheel support means, and a support frame for supporting the wheel support means and the force applicator and adapted to be attached to the movable vehicle.

An object of the subject invention is to provide a device which will allow dynamic testing of the bearing qualities of the ground or the load carrying capacity of a wheel or a tire.

Another object of the subject invention is to provide a device which will allow dynamic testing of a large area of ground in a short period of time.

A further object of the subject invention is to provide a device which is physically compact and which will adapt itself to an existing movable vehicle without impairing the vehicle's original functional purpose.

A still further object of the subject invention is to provide a device which will simulate closely the ground loading of a landing aircraft.

Yet another object of the subject invention is to provide a device which will allow variable loading of the ground wheel or tire while being a very simply constructed and highly reliable device.

Other objects, advantages and novel features of the invention will become apparent from the following detailed description of the invention when considered in conjunction with the accompanying drawings wherein:

BRIEF DESCRIPTION OF THE DRAWINGS

FIG. 4 is an enlarged side view of the test device as shown in FIG. 1.

FIG. 5 is a diagrammatic view of a hydraulic circuit which enables the loading of the test wheel.

DESCRIPTION OF THE PREFERRED EMBODIMENT

Figure 1:
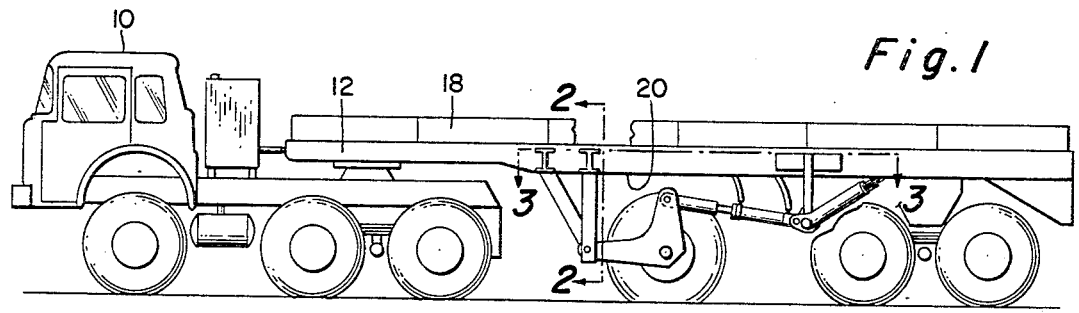
FIG. 1 is a side view of a movable vehicle illustrating the test device mounted on an underside of the vehicle.
Figure 3:
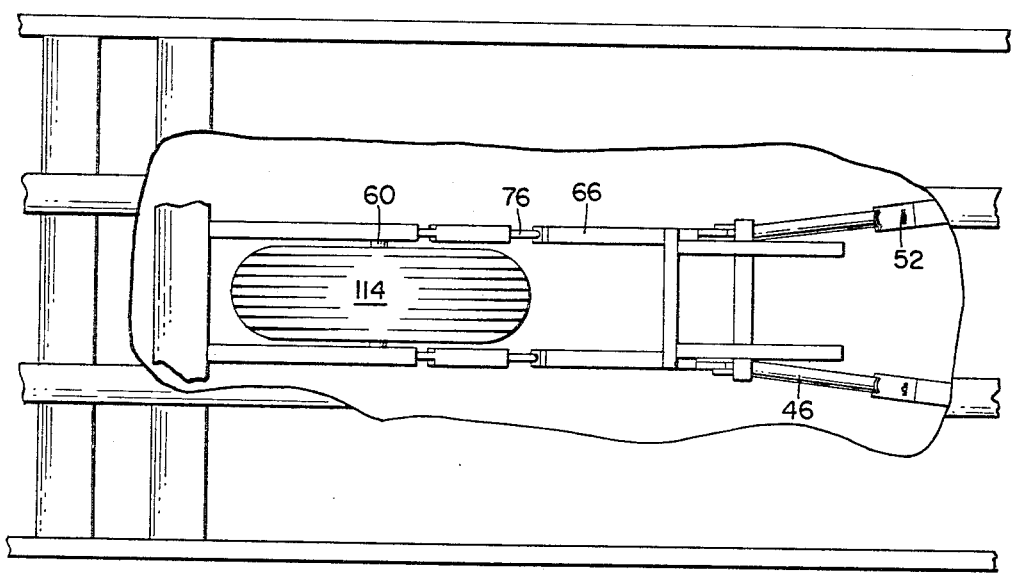
FIG. 3 is an enlarged partially cut away top view taken along line 3—3 of the FIG. 1 embodiment.

Referring now to the drawings wherein like reference numerals designate like or corresponding parts throughout the several views, there is shown in FIG. 1 the test device mounted beneath a movable vehicle such as a trailer 12 which is pulled by a truck 10. Placed on top of the trailer 12 may be weights 18 which may be of any convenient structure such as concrete blocks for counteracting any upward force from the test device. The trailer 12 is of sufficient height to allow the test device to be mounted to its under surface 20 from which the test device may be lowered to contact and bear upon the ground to be tested.

In the arrangement shown in FIG. 1 the test device may not only test the bearing quality of the ground over which the vehicle travels, but may be used as a test bed for wheels and tires when the vehicle is driven over a known bearing quality surface.

FIG. 4 illustrates an enlarged view of a portion of the embodiment shown in FIG. 1. The major elements of my invention comprise in combination a support frame 24, a wheel support means 26, a force applicator 28, and a rotatable test wheel 30.

Figure 2:
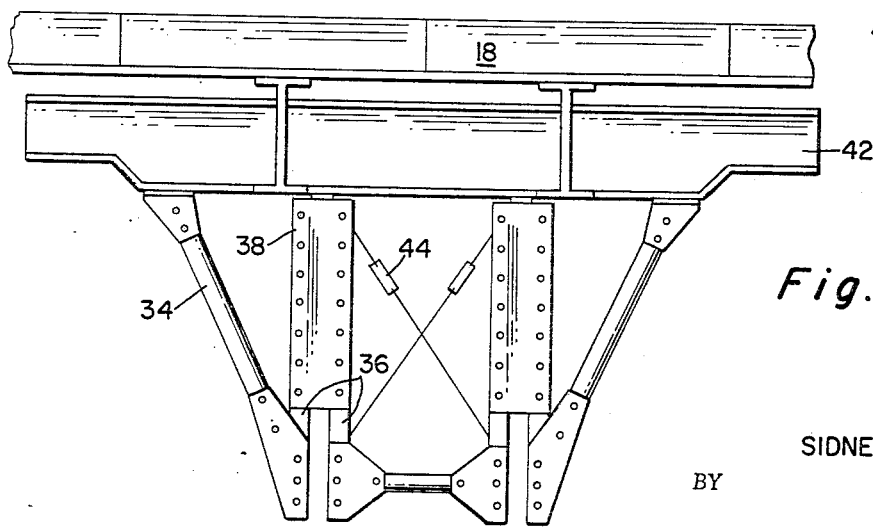
FIG. 2 is an enlarged view taken along line 2—2 of the FIG. 1 embodiment.

The support frame 24, in turn, may be comprised of a forward section and a rearward section, the forward section having structural channels and I-beams such as a forwardly slanting I-beam 32, a laterally slanting channel 34, FIGS. 2 and 4, and vertical channels 36 (FIG. 2) rigidly connected by flat plates 38. The forward section is adapted to be attached to the movable vehicle and, as shown, may be conveniently attached by bolting to ear members 40, FIG. 4, which inturn may be welded to structual I-beams 42 that are integral to the structure of the trailer 12. A crossed turnbuckle and rod combination 44, FIG. 2, may be provided to prevent undesirable lateral movement of the frame members.

The rearward section of the frame support means may comprise a combination of pipe structural elements such as a rearwardly slanting pipe 46, FIG. 4, and a vertical pipe 48. The pipes 46 and 48 are adapted to be attached at one of their ends to the trailer 12 such as by bolting pipe 48 to the trailer at 50 and pinning pipe 46 to an ear which may be welded directly to the trailer as shown at 52. The other ends of the pipes 46 and 48 may be welded to a cross member pipe 53 and act to counter forces from the force applicator 28. The primary function of the support frame 24 is to support the other elements of the test device as well as to react to loading forces as will be explained below.

The wheel support means 26 may be comprised of an L-shaped lever arm having two ends 54 and 56, FIG. 4, and a middle portion 58. One end 56 may be pivotally connected to the force applicator 28 while the other end 54 may be pivotally connected to the forward section of the support frame, that is, to the channels 34 and 36 and to the I-beam 32. The wheel support means may also be comprised of a shaft 60, FIGS. 2 and 4, disposed through the axis of rotation of the test wheel 30 and connected to the middle portion 58 of the L-shaped lever arm. Suitable bearings may be provided dependent upon the load expected to be received by the shaft and any suitable connection may be used to provide support of the shaft by the L-shaped lever arm. The pivotal connections at the ends 54 and 56 may be by any suitable arrangement, such as by pin 62 which extends through the support frame members 32, 34 and 36 and through the end 54 of the L-shaped lever arm, and such as by pin 64 which extends through a portion of the force applicator 28 and the end 56 of the L-shaped lever arm.

The force applicator 28 comprises a cylinder 66 having a bore, open at one end 68 and connected to the rearward section of the frame support means at its other end 70. Such an arrangement may be a pivotable one and may be accomplished by a pin 72 connecting the end 70 to the structural pipe members 46, 48 and 53 as shown. The applicator may also be comprised of a piston head 74 slidably disposed within the cylinder 66 and which is connected to a piston rod 76, the piston rod having two ends, one end 78 being connected to the piston head 40 while the other end 80 may be pivotably connected to the end 56 of the L-shaped lever arm.

Additionally the force applicator may comprise a hydraulic circuit for selectively moving hydraulic fluid toward and away from the piston head 74 so as to provide a force upon the piston head which causes it, in turn, to apply a loading force upon the L-shaped lever arm 26. FIG. 5 illustrates a preferred hydraulic circuit diagram comprising a variable displacement piston pump 90 which may be driven by a gasoline engine 92 so that hydraulic fluid may be removed from a reservoir 94 and pumped selectively to the cylinder 66 (the test device may have two hydraulic cylinders, piston and piston rods which are connected to two L-shaped lever arms, one on each side of the test wheel 30). Also included in the hydraulic circuit are a direction control valve 96 for applying and relieving the loading force and which may be operated manually, a hydraulic fluid filter 98, a valve 100 which may be used to close the hydraulic circuit when the filter is removed for cleaning, a check valve 102 which may be used to prevent a back pressure upon the pump, a pressure gage 104 for indicating system pressure, a needle valve 106 for selectively isolating the pressure gage from the hydraulic circuit so as to protect it during selected periods of operation, a safety valve 108 which may be set at some predetermined maximum allowable pressure so as to prevent damage to the system which may occur during operation of the test device, and hydraulic conduits designated 110, FIGS. 4 and 5, which are used to connect the various circuit components to allow circulation of hydraulic fluid.

Using cylinders having a 5-inch base, pistons with a 25 11/16 inch stroke, setting the safety valve 108 at about 2500 p.s.i., a maximum of 38,500 lbs. was able to be exerted upon the test wheel. In addition, the system allows any lesser force to be applied to the wheel as desired. Initially the test device may be calibrated by plotting measured wheel reactions against the hydraulic fluid pressure setting which produces the reactions; once the calibration curve has been obtained for the device the required hydraulic fluid pressure to produce any desired wheel load is readily obtainable from the calibration curve. There may be more than one direction control valve 96 for placement either within the truck cab or along the trailer 12 as convenience dictates. The hydraulic circuit as shown is obtainable from the Rucker Company of Los Angeles, Calif.

The test wheel 30 may be comprised of a central hub 112 and a tire 114 mounted upon the hub. The central hub may be supported upon the shaft 60 and rotate thereupon. The tire 114 may be of an aircraft type when it is desirable to simulate actual landing of an aircraft upon the ground to be tested.

The material to be used for the support frame, the wheel support means and the metal parts of the other elements may be ordinary steel unless climate conditions or strength requirements dictate otherwise.

OPERATION

In operation the test device will appear as shown in FIGS. 1 and 4. Depending upon the types of aircraft expected to use the field to be tested (or depending upon the loads to be accepted by the surface to be tested) a determination is made of the hydraulic fluid pressure necessary to cause the desired loading force upon the test wheel. This determination is made by simply referring to a calibration curve which had been constructed at an earlier time. The variable pump 90 then forces hydraulic fluid into the cylinder 66 causing the fluid to bear against a surface 120, FIG. 5, of the piston head 74. The piston head 74 will move to the right in the embodiment as shown in FIGS. 4 and 5 causing the piston rod 76 to pull upon the end 56 of the L-shaped lever arm. Reaction forces from the force applicator 28 are received by the structural piping 46 and 48 of the frame support means and transmitted back to the trailer 12 and its weighted load 18.

Since the L-shaped lever arm has its end 54 pinned to the structural members 32, 34 and 36, the lever arm acts to transmit the loading force from the piston rod 76 to the shaft 60 and thereby to the test wheel 30. The lifting forces created at end 54 are transmitted through the pin 62 to the channel and I-beam structural frame supports and thence to the trailer 12 and its weighted load 18.

If it is desired to ease the loading on the test wheel 30, the direction valve 96 is altered to cause hydraulic fluid to be forced against a surface 122 of the piston head 74. This has the effect of moving the piston rod 76 and thereby the end 56 to the left (FIG. 4 and FIG. 5) so as to cause an upward force upon the shaft 60 and thereby the test wheel 30. One of the more desirable features of the test device is that by continually causing a lifting force upon the test wheel, the wheel will disengage itself from the surface and be tucked beneath the trailer 12 so as to allow the trailer and truck combination to be used as a hauling device. It is to be noted that the trailer in no way is encumbered upon its hauling upper surface by the test device so that the trailer may easily be transformed from a hauling device to a test bed.

It is also to be understood that wheel testing may also be accomplished with this device as well as bearing testing of the ground since, having a known ground surface, various loading of an experimental wheel may be accomplished under dynamic conditions. Experiments conducted at the Antarctic to test the bearing qualities of snow airfields were able to be accomplished in a relatively short period of time due to the ability of the truck-trailer combination to move at speeds of 25 to 30 miles per hour.

Obviously many modifications and variations of the present invention are possible in the light of the above teachings. It is therefore to be understood that the invention may be practiced otherwise than as specifically described.

I claim:
1. Test apparatus for use with a truck trailer of a type having a wheel-supported load-carrying flatbed adapted for overland travel, said appartaus comprising:
   an L-shaped lever having two ends and a medially-disposed pivotal axis,
   a test wheel,
   a test wheel axle rotatably supporting said wheel and journalled in said lever on said axis,
   first and second bracing members rigidly secured to and extending downwardly of said trailer bed in longitudinally-spaced disposition,
   means pivotally coupling one end of said lever to said first bracing member,
   force applicator means having a reciprocally-driven piston pivotally coupled at its free end to the other end of said lever,
   a cylinder member for said piston,
   means pivotally coupling said cylinder member to the second bracing member,
   fluid means for driving said piston, reciprocation of the piston in one direction forcing said test wheel axle downwardly between said first and second rigidly secured bracing members, the weight of said flatbed counteracting the lift forces applied to it, fluid pressure control means for selectively varying the fluid pressure applied to said piston whereby the downward force of said test wheel can be controllably varied.

2. The apparatus of claim 1 wherein said test wheel is adapted to test the suitability of aircraft runway conditions for use by particular aircraft, said test wheel including a tire dimensioned in conformity with the tires of said particular aircraft.

References Cited
UNITED STATES PATENTS

| | | |
|---|---|---|
| 2,025,743 | 12/1935 | Hathorn. |
| 2,505,652 | 4/1950 | Schweitzer et al. __ 244—102 XR |
| 2,902,289 | 9/1959 | North _____ 189—9.52 XR |

DONALD O. WOODIEL, Primary Examiner

U.S. Cl. X.R.
73—84